United States Patent
Zhang et al.

(10) Patent No.: US 11,570,100 B2
(45) Date of Patent: Jan. 31, 2023

(54) DATA PROCESSING METHOD, APPARATUS, MEDIUM AND DEVICE

(71) Applicant: Advanced New Technologies Co., Ltd., Grand Cayman (KY)

(72) Inventors: Hongquan Zhang, Hangzhou (CN); Lingtao Kong, Hangzhou (CN); Guannan Kou, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 15 days.

(21) Appl. No.: 16/809,224

(22) Filed: Mar. 4, 2020

(65) Prior Publication Data

US 2020/0344164 A1    Oct. 29, 2020

Related U.S. Application Data

(63) Continuation of application No. PCT/CN2020/070978, filed on Jan. 8, 2020.

(30) Foreign Application Priority Data

Apr. 25, 2019 (CN) .......................... 201910340394.8

(51) Int. Cl.
*H04L 45/74* (2022.01)
*H04L 67/141* (2022.01)
(Continued)

(52) U.S. Cl.
CPC ............ *H04L 45/74* (2013.01); *H04L 67/141* (2013.01); *H04L 69/164* (2013.01); *H04L 69/22* (2013.01); *H04L 2212/00* (2013.01)

(58) Field of Classification Search
CPC ....... H04L 45/74; H04L 69/164; H04L 69/22; H04L 67/141; H04L 2212/00
See application file for complete search history.

(56) References Cited

U.S. PATENT DOCUMENTS 6,055,238 A * 4/2000 Tanabe ............... H04Q 11/0478
370/398
6,667,959 B1 * 12/2003 Hebb .................... H04L 49/555
370/241
(Continued)

FOREIGN PATENT DOCUMENTS

CN          1377549     10/2002
CN        105103522     11/2015
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Gary Mui
*Assistant Examiner* — Chuong M Nguyen
(74) *Attorney, Agent, or Firm* — Fish & Richardson P.C.

(57) ABSTRACT

The present specification discloses a data processing method, apparatus, medium and device. The method includes: receiving a QUIC data packet that is sent by a first device and that includes a CID; parsing the CID and determining a routing address based on a parsing result; and routing the received QUIC data packet to a second device based on the routing address, so the second device processes the QUIC data packet. When a data packet sent by a transmitting end device is received, a routing address of data transmission is determined by processing the received data packet, to quickly establish a data transmission channel between the transmitting end device and a receiving end device. As such, stored context information is not required, and connection errors caused by exceptions such as restarting and scaling in/out on a load balancer will not occur,
(Continued)

thereby effectively improving processing efficiency of data transmission by using the QUIC protocol.

29 Claims, 10 Drawing Sheets

(51) Int. Cl.
*H04L 69/22* (2022.01)
*H04L 69/164* (2022.01)

(56) References Cited

U.S. PATENT DOCUMENTS

| | | | | |
|---|---|---|---|---|
| 6,862,267 | B1* | 3/2005 | Hughes | H04L 61/00 370/252 |
| 9,158,526 | B1* | 10/2015 | Nguyen | H04W 40/04 |
| 2005/0055435 | A1* | 3/2005 | Gbadegesin | H04L 67/1008 709/224 |
| 2008/0034201 | A1* | 2/2008 | Munger | H04L 63/0421 713/153 |
| 2008/0285501 | A1* | 11/2008 | Zhang | H04W 88/04 370/315 |
| 2012/0047572 | A1* | 2/2012 | Duncan | H04L 69/167 726/13 |
| 2014/0310418 | A1* | 10/2014 | Sorenson, III | H04L 67/1001 709/226 |
| 2018/0139131 | A1* | 5/2018 | Ignatchenko | H04L 43/10 |
| 2019/0044705 | A1* | 2/2019 | Deval | H04L 69/164 |
| 2019/0199835 | A1* | 6/2019 | Deval | H04L 69/162 |
| 2019/0208554 | A1* | 7/2019 | Ruiz | H04L 69/161 |
| 2019/0229903 | A1* | 7/2019 | Balasubramanian | H04L 63/166 |
| 2019/0306109 | A1* | 10/2019 | Masputra | H04L 63/166 |
| 2019/0319873 | A1* | 10/2019 | Shelar | H04L 45/22 |
| 2019/0394308 | A1* | 12/2019 | Balasubramanian | H04L 69/165 |
| 2020/0120555 | A1* | 4/2020 | Patil | H04L 63/0428 |
| 2020/0145324 | A1* | 5/2020 | Wei | H04L 69/16 |
| 2020/0213387 | A1* | 7/2020 | Avila | H04L 67/02 |

FOREIGN PATENT DOCUMENTS

| | | |
|---|---|---|
| CN | 108234433 | 6/2018 |
| CN | 108769102 | 11/2018 |
| CN | 109155744 | 1/2019 |
| CN | 109218186 | 1/2019 |
| CN | 109309685 | 2/2019 |
| CN | 109413219 | 3/2019 |
| CN | 110177082 | 8/2019 |
| WO | WO 2018086076 | 5/2018 |
| WO | WO 2018233504 | 12/2018 |
| WO | WO-2019007209 A1 * | 1/2019 ............. H04L 12/66 |

OTHER PUBLICATIONS

Nakamoto, "Bitcoin: A Peer-to-Peer Electronic Cash System," www.bitcoin.org, 2005, 9 pages.
PCT International Search Report and Written Opinion in International Application No. PCT/CN2020/070978, dated Mar. 27, 2020, 19 pages (with machine translation).
International Preliminary Report on Patentability in International Appln. No. PCT/CN2020/070978, dated Sep. 28, 2021, 6 pages.

* cited by examiner 2-byte common header

```
0                1                2
+----------------+----------------+
|    type        |      R         |
+----------------+----------------+
```

DATA PROCESSING METHOD, APPARATUS, MEDIUM AND DEVICE

CROSS-REFERENCE TO RELATED APPLICATIONS

This application is a continuation of PCT Application No. PCT/CN2020/070978, filed on Jan. 8, 2020, which claims priority to Chinese Patent Application No. 201910340394.8, filed on Apr. 25, 2019, and each application is hereby incorporated by reference in its entirety.

TECHNICAL FIELD

The present disclosure relates to the field of computer technologies, and in particular, to data processing methods, apparatuses, media and devices.

BACKGROUND

With development of network technologies, users have higher demands on network transmission efficiency and web response speeds. As an emerging transport layer protocol, compared with the TCP protocol and the Transport Layer Security (TLS) protocol, the Quick UDP Internet Connection (QUIC) protocol offers low link establishment overhead without head-of-line blocking.

SUMMARY

Implementations of the present specification provide data processing methods, apparatuses, media and devices, so as to implement stateless data processing when data is transmitted by using the QUIC protocol.

The following technical solutions are used in the implementations of the present specification.

Some implementations of the present specification provide a data processing method, applied to a load balancer that supports the QUIC protocol, including: receiving a QUIC data packet sent by a first device, where the QUIC data packet includes a connection identifier CID; parsing the CID and determining a routing address based on a parsing result; and sending the QUIC data packet to a second device based on the determined routing address, so the second device processes the QUIC data packet.

Some implementations of the present specification further provide a data processing method, applied to a load balancer that supports the QUIC protocol, including: receiving a connection establishment data packet sent by a client-side device, where the connection establishment data packet does not include a routing address of a server-side device; randomly selecting a server-side device, encapsulating the connection establishment data packet based on an encapsulation format corresponding to a specified first encapsulation protocol, and sending the encapsulated connection establishment data packet to the server-side device, where the encapsulated connection establishment data packet includes a routing address of the client-side device; receiving response data sent by the server-side device, and determining a routing address of the server-side device, where the response data includes the routing address of the client-side device; and sending the determined routing address of the server-side device to the client-side device based on the routing address of the client-side device.

Some implementations of the present specification further provide a data processing method, applied to a client device that supports the QUIC protocol, including: generating a QUIC data packet based on an encapsulation format corresponding to a specified second encapsulation protocol, where the QUIC data packet includes a connection identifier CID; sending the QUIC data to a load balancer; and receiving a data processing result sent by the load balancer, where the data processing result is obtained after the load balancer parses the CID to obtain a routing address and sends the QUIC data packet to a server-side device corresponding to the routing address, and the server-side device processes the QUIC data packet.

Some implementations of the present specification further provide a data processing method, applied to a client device that supports the QUIC protocol, including: sending a connection establishment data packet to a load balancer, where the connection establishment data packet does not include a routing address of a server-side device; receiving a connection establishment response data packet sent by the load balancer, where the connection establishment response data packet includes a routing address of a server-side device that establishes a data transmission channel with the client-side device, the routing address of the server-side device is determined by the load balancer based on response data sent by the server-side device, and the response data is obtained by the server-side device by processing the received connection establishment data packet sent by the load balancer; and generating a QUIC data packet based on the routing address of the server-side device and an encapsulation format corresponding to a specified second encapsulation protocol.

Some implementations of the present specification further provide a data processing method, applied to a server-side device that supports the QUIC protocol, including: receiving a connection establishment data packet sent by a load balancer, where the connection establishment data packet is obtained by the load balancer by encapsulating, based on an encapsulation format corresponding to a specified first encapsulation protocol, a received data packet sent by a client-side device, and the connection establishment data packet includes a routing address of the client-side device; and sending a response data packet to the load balancer, so the load balancer determines a routing address of the server-side device based on the response data packet.

Some implementations of the present specification further provide a data processing apparatus, including: a receiving unit, configured to receive a QUIC data packet sent by a first device, where the QUIC data packet includes a connection identifier CID; a processing unit, configured to parse the CID and determine a routing address based on a parsing result; and a sending unit, configured to send the QUIC data packet to a second device based on the determined routing address, so the second device processes the QUIC data packet.

Some implementations of the present specification further provide a data processing apparatus, including: a receiving unit, configured to receive a connection establishment data packet sent by a client-side device, where the connection establishment data packet does not include a routing address of a server-side device; a processing unit, configured to randomly select a server-side device, encapsulate the connection establishment data packet based on an encapsulation format corresponding to a specified first encapsulation protocol, and send the encapsulated connection establishment data packet to the server-side device, where the encapsulated connection establishment data packet includes a routing address of the client-side device; where the receiving unit is configured to receive response data sent by the server-side device; and the processing unit is configured to determine the routing address of the server-side device, where the response data includes the routing address of the client-side device; and a sending unit, configured to send the determined routing address of the server-side device to the client-side device based on the routing address of the client-side device.

Some implementations of the present specification further provide a data processing apparatus, including: a processing unit, configured to generate a QUIC data packet based on an encapsulation format corresponding to a specified second encapsulation protocol, where the QUIC data packet includes a connection identifier CID; a sending unit, configured to send the QUIC data to a load balancer; and a receiving unit, configured to receive a data processing result sent by the load balancer, where the data processing result is obtained after the load balancer parses the CID to obtain a routing address and sends the QUIC data packet to a server-side device corresponding to the routing address, and the server-side device processes the QUIC data packet.

Some implementations of the present specification further provide a data processing apparatus, including: a sending unit, configured to send a connection establishment data packet to a load balancer, where the connection establishment data packet does not include a routing address of a server-side device; a receiving unit, configured to receive a connection establishment response data packet sent by the load balancer, where the connection establishment response data packet includes a routing address of a server-side device that establishes a data transmission channel with the client-side device, the routing address of the server-side device is determined by the load balancer based on response data sent by the server-side device, and the response data is obtained by the server-side device by processing the received connection establishment data packet sent by the load balancer; and a processing unit, configured to generate a QUIC data packet based on the routing address of the server-side device and an encapsulation format corresponding to a specified second encapsulation protocol.

Some implementations of the present specification further provide a data processing apparatus, applied to a server-side device that supports the QUIC protocol, including: a receiving unit, configured to receive a connection establishment data packet sent by a load balancer, where the connection establishment data packet is obtained by the load balancer by encapsulating, based on an encapsulation format corresponding to a specified first encapsulation protocol, a received data packet sent by a client-side device, and the connection establishment data packet includes a routing address of the client-side device; and a processing unit, configured to send a response data packet to the load balancer based on a routing address of the load balancer, so the load balancer determines a routing address of the server-side device based on the response data packet.

Some implementations of the present specification further provide a computer readable storage medium. The computer readable storage medium stores computer program instructions, and the previous method is implemented when the computer program instructions are executed by a processor.

Some implementations of the present specification further provide a data processing device, including: at least one processor, at least one memory, and computer program instructions stored in the memory, where the previous method is implemented when the computer program instructions are executed by the processor.

The at least one technical solution used in the implementations of the present specification can achieve the following beneficial effects:

According to the technical solutions described in the implementations of the present specification, the QUIC data packet that is sent by the first device and that includes the CID is received, the CID is parsed, the routing address is determined based on the parsing result, and the received QUIC data packet is routed to the second device based on the routing address, so the second device processes the QUIC data packet. When receiving a data packet sent by a transmitting end device, a load balancer determines a routing address of data transmission by processing the received data packet, and quickly establishes a data transmission channel between the transmitting end device and a receiving end device. As such, stored context information is not required, and connection errors caused by exceptions such as restarting and scaling in/out on the load balancer will not occur, thereby effectively improving processing efficiency of data transmission by using the QUIC protocol.

BRIEF DESCRIPTION OF DRAWINGS

The accompanying drawings described here are intended to provide a further understanding of the present disclosure, and constitute a part of the present disclosure. The illustrative implementations of the present disclosure and descriptions thereof are intended to describe the present disclosure, and do not constitute limitations on the present disclosure. In the accompanying drawings.

DESCRIPTION OF IMPLEMENTATIONS

Figures 1, 2, 3, 4:
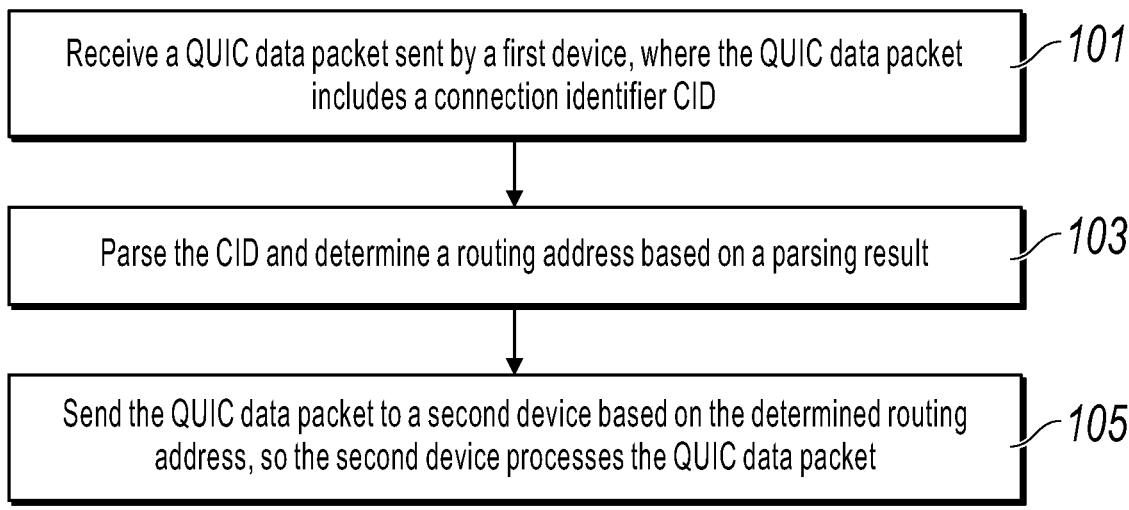
FIG. 1 is a schematic flowchart illustrating a data processing method, according to some implementations of the present specification.
FIG. 2 is a schematic diagram illustrating an encapsulation format corresponding to a second encapsulation protocol, according to some implementations of the present specification.
FIG. 3 is a schematic diagram illustrating an encapsulation format corresponding to another second encapsulation protocol, according to some implementations of the present specification.
FIG. 4 is a schematic diagram illustrating a header format corresponding to a first encapsulation protocol, according to some implementations of the present specification.

In practice, because the QUIC protocol is a new transmission protocol, distributed deployment and load balancing of servers that support the QUIC protocol need to be considered. Currently, a hash operation is performed on an apparatus used for load balancing, for example, a Linux virtual server (LVS), by using a four-tuple (specifically including a source IP address, a source Port, a destination IP address, and a destination Port), and a server is selected based on a calculation result, so as to implement load balancing of a server cluster. However, the QUIC protocol specifies that a connection identifier (CID) is used to identify a connection. When a connection migration occurs, the four-tuple changes. In this case, if a hash operation is performed still based on the four-tuple, the connection migration will fail. Therefore, how to ensure that data can be processed in a stateless way when data is transmitted by using the QUIC protocol is an important problem that needs to be solved.

To resolve the problem recorded in the present specification and implement the objective of the present specification, implementations of the present specification provide data processing methods, apparatuses, media and devices. A QUIC data packet that is sent by a first device and that includes a CID is received, the CID is parsed, a routing address is determined based on a parsing result, and the received QUIC data packet is routed to a second device based on the routing address, so the second device processes the QUIC data packet. When receiving a data packet sent by a transmitting end device, a load balancer determines a routing address of data transmission by processing the received data packet, and quickly establishes a data transmission channel between the transmitting end device and a receiving end device. As such, stored context information is not required, and connection errors caused by exceptions such as restarting and scaling in/out on the load balancer will not occur, thereby effectively improving processing efficiency of data transmission by using the QUIC protocol.

It is worthwhile to note that the "stateless" in the implementations of the present specification is relative to stateful. For example, a user logs in to a server by using a client, and the server stores context information of the user. In this case, the server is stateful, because the server can process, based on the context information of the user, a service request sent by the user. Different stateful servers are in a replica relationship, and data synchronization needs to be maintained.

For a stateless server, the server does not need to store the context information of the user, and only needs to process each service request submitted by the user and return a processing result. Different stateless servers are peers and not interdependent. Any stateless server that receives a service request of a user has the same processing result for the service request.

That is, once a system is scaled in/out, restarted, etc., the stateless load balancer (the load balancer here is located between a client and a server, and is configured to accurately transmit a data processing request sent by the client to a required server, so the server performs fast processing) described in the implementations of the present specification can still accurately route the data processing request to the required server for processing, thereby successfully implementing connection migration.

A first encapsulation protocol and a second encapsulation protocol described in the implementations of the present specification are different data transmission protocols. "First" and "second" here have no special meaning, and represent only different encapsulation protocols.

Preferably, an encapsulation format supported by the first encapsulation protocol includes an address bit of a load balancer and an address bit of a client-side device. An encapsulation format supported by the second encapsulation protocol includes a CID identifier bit and an address bit of a server-side device.

A CID recorded in the implementations of the present specification replaces a conventional quintuple (that is, a source IP address, a source Port, a destination IP address, a destination Port, and a transport protocol) in the QUIC protocol, and is used to uniquely identify a connection (the connection here can be understood as a connection between a client-side device and a server-side device).

The QUIC protocol described in the implementations of the present specification can be understood as a reliable and secure transmission protocol implemented in a user mode based on UDP. The load balancer described in the implementations of the present specification can be understood as an apparatus configured to implement load balancing. The apparatus supports the load balancing technology. The load balancing technology is used to allocate load among multiple computers, network connections, CPUs, disk drives, or other resources, to achieve the purpose of optimizing resource usage, maximizing throughput, minimizing response time, and avoiding overload. Here, load balancing is mainly implemented on a network server.

The "random selection" recorded in the implementations of the present specification can be a certain random algorithm, or can be a certain random rule. A random selection method is not limited here.

The following clearly and comprehensively describes the technical solutions in the present specification with reference to the specific implementations of the present specification and the corresponding accompanying drawings. Clearly, the described implementations are merely some but not all of the implementations of the present specification. All other implementations obtained by a person of ordinary skill in the art based on the implementations of the present specification without creative efforts shall fall within the protection scope of the present specification.

The technical solutions provided in the implementations of the present specification are described in detail below with reference to the accompanying drawings.

Before the implementations are specifically described, application scenarios of the technical solutions described in the implementations of the present specification include but are not limited to the following two scenarios: In the first scenario, a data transmission channel is established between a first device and a second device, that is, the first device serving as a transmitting end obtains a routing address of the second device serving as a receiving end. In this case, a CID corresponding to the first device and the second device includes the routing address of the second device, and an intermediate device (also referred to as a load balancer) that establishes a connection to the first device and the second device can determine the routing address by using the CID included in a data packet, so as to implement data exchange between the first device and the second device. In the second scenario, a data transmission channel has not been established between the first device and the second device, that is, the first device serving as the transmitting end has not obtained the routing address of the second device serving as the receiving end. By using the technical solutions provided in the implementations of the present specification, the first device can obtain the routing address of the second device, thereby laying a foundation for establishing a data transmission channel between the first device and the second device.

FIG. 1 is a schematic flowchart illustrating a data processing method, according to some implementations of the present specification. The method can be described as follows. This implementation of the present specification is executed by a load balancer that supports the QUIC protocol, which can be referred to as another device and is used to implement data transmission between a first device and a second device in a stateless case. The previous first scenario is used as an example for description here.

Step 101: Receive a QUIC data packet sent by the first device, where the QUIC data packet includes a connection identifier CID.

In some implementations of the present specification, the first device randomly selects one load balancer from an intermediate device cluster (the intermediate device cluster here can be understood as including multiple load balancers), encapsulates data to be sent based on an encapsulation format corresponding to a specified second encapsulation protocol, to obtain a data packet (hereinafter referred to as a QUIC data packet) that supports the QUIC protocol, and sends the obtained QUIC data packet to the selected load balancer.

Encapsulating the data to be sent based on the encapsulation format corresponding to the specified second encapsulation protocol here can be understood as writing corresponding content into a corresponding field based on the encapsulation format corresponding to the second encapsulation protocol, so as to obtain the QUIC data packet.

The encapsulation format corresponding to the second encapsulation protocol is determined based on a version number corresponding to a routing address of a server-side device. For example, if the address of the server-side device is classified into an IPV4 address and an IPV6 address, the encapsulation format corresponding to the second encapsulation protocol is also different, and content included in the QUIC data packet obtained through encapsulation based on the second encapsulation protocol is also different.

If the address of the server-side device is an IPV4 address, the encapsulation format corresponding to the second encapsulation protocol provided in this implementation of the present specification is shown in FIG. 2. It can be seen from FIG. 2 that the encapsulation format includes N bytes. The six bytes on the left include the routing address of the server-side device.

On the left side, in the first byte, the first 2 bits are used to identify whether the routing address of the server-side device is included. For example, "00" indicates that the routing address of the server-side device is not included, "01" indicates that the address of the server-side device is an IPV4 address, and "10" indicates that the address of the server-side device is an IPV6 address. The remaining 6 bits in the first byte are used to map address segment A in the IPV4 address. Bytes 2 and 3 identify a port number of the server-side device. Bytes 4 to 6 identify address segments B, C, and D in the IPV4 address. Bytes 6 to N are random numbers.

If the address of the server-side device is an IPV6 address, the encapsulation format corresponding to the second encapsulation protocol provided in this implementation of the present specification is shown in FIG. 3. It can be seen from FIG. 3 that the encapsulation format includes 18 bytes. The 13 bytes on the left include the routing address of the server-side device.

On the left side, in the first byte, the first 2 bits are used to identify whether the routing address of the server-side device is included. For example, "00" indicates that the routing address of the server-side device is not included, "01" indicates that the address of the server-side device is an IPV4 address, and "10" indicates that the address of the server-side device is an IPV6 address. The remaining 6 bits in the first byte are used to map a prefix of the IPV6 address. For example, the 6 bits here are used to map a 7-bit prefix+1-bit L+40-bit global id. Bytes 2 and 3 identify a port number of the server-side device. Bytes 4 to 13 identify a 2-byte subnet id and an 8-byte interface id in the IPV6 address. Bytes 14 to 18 are random numbers.

It is worthwhile to note that, if the QUIC protocol refers to the QUIC protocol standardized by the Internet Engineering Task Force (IETF), the encapsulation format corresponding to the second encapsulation protocol is 18 bytes at most. To avoid a conflict, if the address of the server-side device is an IPV4 address, N here should be greater than 14, that is, a random number of 8 bytes needs to be reserved.

Preferably, encapsulating data to be sent based on an encapsulation format corresponding to a specified second encapsulation protocol can further include:

If the address of the server-side device is an IPV4 address, in addition to the leftmost first byte shown in FIG. 2, remaining N-1 bytes are encrypted by using an encryption algorithm; and if the address of the server-side device is an IPV6 address, in addition to the leftmost first byte shown in FIG. 3, remaining 17 bytes are encrypted by using an encryption algorithm.

When the data to be sent is encapsulated based on the encapsulation format corresponding to the specified second encapsulation protocol, because the routing address of the server-side device has been obtained, to ensure data transmission efficiency, a short header can be used to omit header information of some QUIC data packets.

It is worthwhile to note that, in some implementations provided in the present specification, if a connection migration occurs, the QUIC data packet changes. If the address of the server-side device is an IPV4 address, the leftmost 6 bytes in the format shown in FIG. 2 remain unchanged. If the address of the server-side device is an IPV6 address, the leftmost 13 bytes in the format shown in FIG. 3 remain unchanged, and content of another byte can change based on a migration requirement. As such, it can be ensured that when receiving the QUIC data packet, a load balancer in a stateless state can effectively process the QUIC data packet.

Step 103: Parse the CID and determine a routing address based on a parsing result.

In this implementation of the present specification, when receiving the QUIC data packet, the load balancer parses the QUIC data packet by using a decryption algorithm to obtain a plaintext CID. Based on the CID format, the routing address can be parsed reversely from the plaintext CID.

The routing address here can be an IP address and a port number of the server-side device, or can be another form of information. A form of the routing address is not specifically limited here.

Preferably, the CID can include at least one of a source CID or a destination CID. A difference between the source CID and the destination CID recorded in this implementation of the present specification lies in functions. When the first device sends data to the load balancer, the load balancer can determine, based on a destination CID included in the data, a second device to which the data is forwarded. The load balancer can determine, based on a source CID included in the data, that the data is from the first device.

It is worthwhile to note that the source CID includes a routing address of a transmitting end device. The destination CID includes a routing address of a receiving end device. If the transmitting end device does not know the routing address of the receiving end device, the destination CID included in the data sent by the transmitting end device is null.

Step 105: Send the QUIC data packet to a second device based on the determined routing address, so the second device processes the QUIC data packet.

In some implementations of the present specification, the load balancer encapsulates the QUIC data packet based on the determined routing address and the encapsulation format corresponding to the specified first encapsulation protocol, where the encapsulated QUIC data packet includes the routing address of the first device.

Encapsulating the QUIC data packet based on the encapsulation format corresponding to the specified first encapsulation protocol here can be understood as writing corresponding content into a corresponding field based on the encapsulation format corresponding to the first encapsulation protocol, so as to obtain the encapsulated QUIC data packet.

The first encapsulation protocol described in some implementations of the present specification is used to transfer, between the load balancer and the second device, 4-tuple information of the first device received by the load balancer. That is, when receiving the QUIC data packet sent by the first device, the load balancer can determine one piece of 4-tuple information, where the 4-tuple information includes an IP address of the first device, a port of the first device, an IP address of the load balancer, and a port of the load balancer.

FIG. 4 is a schematic diagram illustrating a header format corresponding to a first encapsulation protocol, according to some implementations of the present specification. It can be seen from FIG. 4 that the header format includes two bytes, where one byte identifies a type, and the other byte is reserved bits. For example, if the type is 0x01, it indicates that the first encapsulation protocol of a 4-tuple is transferred. The reserved bit is C, which identifies IPV4. The reserved bit is S, which identifies IPV6.

It is worthwhile to note that, that the load balancer encapsulates the QUIC data packet based on the encapsulation format corresponding to the specified first encapsulation protocol in step 105 specifically includes the following: The load balancer can determine a routing address of the second device, determine a type of the routing address of the second device, and further modify a reserved bit in a header format based on the determined routing address type. If the second device uses an IPV4 address, the reserved bit is changed to C; if the second device uses an IPV6 address, the reserved bit is changed to S.

Specifically, the load balancer encapsulates, based on the encapsulation format corresponding to the specified first encapsulation protocol, the IP address of the first device, the port of the first device, the IP address of the load balancer, and the port of the load balancer at the front of the QUIC data packet, to obtain the encapsulated QUIC data packet.

As such, when receiving the encapsulated QUIC data packet sent by the load balancer, the server-side device can determine, based on the 4-tuple information included in the QUIC data packet, the routing address of the client-side device corresponding to the QUIC data packet.

It is worthwhile to note that because the encapsulation protocol used in step 105 is different from the encapsulation protocol used in step 101, header content of the encapsulated QUIC data packet recorded in step 105 is also different from header content of the QUIC data packet recorded in step 101.

According to the technical solution described in this implementation of the present specification, the QUIC data packet that is sent by the first device and that includes the CID is received, the CID is parsed, the routing address is determined based on the parsing result, and the received QUIC data packet is routed to the second device based on the routing address, so the second device processes the QUIC data packet. When receiving a data packet sent by a transmitting end device, a load balancer determines a routing address of data transmission by processing the received data packet, and quickly establishes a data transmission channel between the transmitting end device and a receiving end device. As such, stored context information is not required, and connection errors caused by exceptions such as restarting and scaling in/out on the load balancer will not occur, thereby effectively improving processing efficiency of data transmission by using the QUIC protocol.

Figure 5:
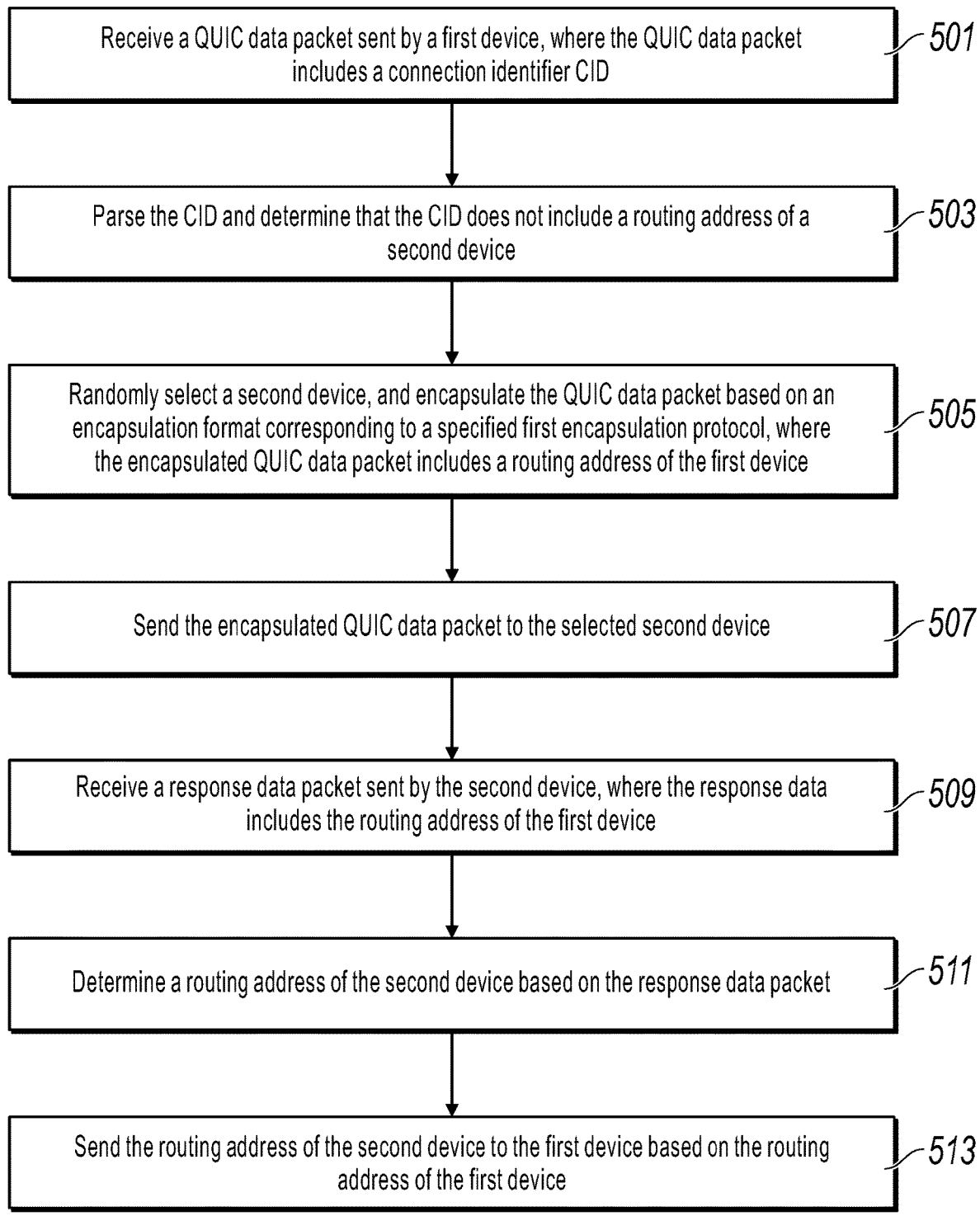
FIG. 5 is a schematic flowchart illustrating a data processing method, according to some implementations of the present specification.

Based on the same inventive concept, FIG. 5 is a schematic flowchart illustrating a data processing method, according to some implementations of the present specification. This implementation is executed by a load balancer that supports the QUIC protocol, which can be referred to as another device and is used to establish a data transmission channel between a first device and a second device. The previous second scenario is used as an example for description here.

Step 501: Receive a QUIC data packet sent by the first device, where the QUIC data packet includes a connection identifier CID.

In some implementations of the present specification, the QUIC data packet sent by the first device in step 501 is formed in the same way as that described in step 101. A difference lies in that the QUIC data packet sent by the first device in step 501 does not include a routing address of the second device.

That is, if the format shown in FIG. 2 is used, the first 2 bits in the first byte are "00", and bytes 2 to 6 are null.

If the format shown in FIG. 3 is used, the first 2 bits in the first byte are "00", and bytes 2 to 13 are null.

Step 503: Parse the CID and determine that the CID does not include a routing address of the second device.

In some implementations of the present specification, it is determined whether the first byte of the CID is 00, and if yes, it is determined that the CID does not include the routing address of the second device.

Step 505: Randomly select a second device, and encapsulate the QUIC data packet based on an encapsulation format corresponding to a specified first encapsulation protocol, where the encapsulated QUIC data packet includes a routing address of the first device.

In some implementations of the present specification, the load balancer randomly selects one second device from multiple second devices on a server side. A random selection method used here can ensure server-side device load balancing.

Because a method of encapsulating the QUIC data packet based on the encapsulation format corresponding to the specified first encapsulation protocol is the same as the encapsulation method described in step 105, details are omitted here.

Step 507: Send the encapsulated QUIC data packet to the selected second device.

Preferably, in some implementations of the present specification, a correspondence between the QUIC data packet and the routing address of the second device is stored.

Step 509: Receive a response data packet sent by the second device, where the response data includes the routing address of the first device.

In some implementations of the present specification, if a QUIC protocol standard used by the second device is different, the response data packet generated by the second device is also different.

When receiving the encapsulated QUIC data packet sent by the load balancer, the second device first determines, based on the encapsulation format of the specified first encapsulation protocol, 4-tuple information that includes an IP address of the first device, a port of the first device, an IP address of the load balancer, and a port of the load balancer.

Second, the second device generates the response data based on the 4-tuple information.

Case 1: If the QUIC protocol used by the second device is the QUIC protocol standardized by the IETF organization, because the QUIC protocol standardized by the IETF organization allows the second device to modify the CID included in the received QUIC data packet, the second device can directly modify the CID included in the received encapsulated QUIC data packet, and write the routing address of the second device into a CID pair of the QUIC data packet. The second device generates the response data packet based on the 4-tuple information and the modified QUIC data packet, and the response data packet includes the routing address of the second device.

It is worthwhile to note that, the routing address of the second device can be written into the CID pair of the QUIC data packet based on the encapsulation format corresponding to the specified second encapsulation protocol, and written into an address bit of the server-side device corresponding to the CID, or can be written in another way, which is not specifically limited here.

Case 2: If the QUIC protocol used by the second device is Google QUIC, because Google QUIC does not allow the second device to modify the CID included in the received QUIC data packet, the second device determines, based on the encapsulation format of the specified first encapsulation protocol, 4-tuple information that includes the IP address of the first device, the port of the first device, the IP address of the load balancer, and the port of the load balancer; sends a response data packet to the load balancer based on the 4-tuple information. The response data packet only adds the 4-tuple information compared with a normal response message, that is, the response data packet does not include the routing address of the second device.

Step 511: Determine a routing address of the second device based on the response data packet.

In some implementations of the present specification, for case 1 described in step 509 that "determining that the response data packet includes the routing address of the second device, where the routing address of the second device is obtained by the second device by encapsulating the response data packet based on the encapsulation format corresponding to the specified second encapsulation protocol", the response data packet is parsed to determine that the CID of the response data packet includes the routing address of the second device.

For case 2 in step 509, if the response data packet does not include the routing address of the second device, an address used by the second device to send the response data packet is determined as the routing address of the second device.

Preferably, for case 2 described in step 509, when the routing address of the second device is determined, the load balancer generates a new QUIC data packet based on the routing address of the second device, and the new QUIC data packet includes the routing address of the second device.

Specifically, when determining the routing address of the second device, the load balancer encapsulates and generates a new QUIC data packet based on the routing address of the second device and the encapsulation format corresponding to the specified second encapsulation protocol.

The new QUIC data packet includes the routing address of the second device.

Step 513: Send the routing address of the second device to the first device based on the routing address of the first device.

In some implementations of the present specification, for case 1, the response data packet is sent to the first device; and for case 2, the new QUIC data packet is sent to the first device.

It is worthwhile to note that "first" and "second" in the "first device" and "the second device" recorded in the implementations of the present specification have no special meaning, and refer to only data transmission devices on different sides.

In some implementations of the present specification, the second encapsulation protocol is used to encapsulate the routing address of the server-side device by using field information of the CID defined in the QUIC protocol.

The server-side device can encapsulate the routing address of the server-side device in the response data packet by using the second encapsulation protocol. As such, when receiving the response data packet, the load balancer directly forwards the response data packet to the client-side device, so the client-side device can initiate data exchange with the server-side device after receiving the response data packet.

If the server-side device does not encapsulate the routing address of the server-side device in the response data packet, when receiving the response data packet, the load balancer encapsulates the routing address of the server-side device in the response data packet by using the second encapsulation protocol, and sends the response data packet to the client-side device. In this case, after receiving the response data packet, the client-side device can also initiate data exchange with the server-side device.

According to the technical solution provided in this implementation of the present specification, when no data transmission channel is established between the first device and the second device, the load balancer is used as a link for data transmission. In one aspect, when receiving data of the client-side device, the load balancer selects a server-side device randomly, and quickly obtains a routing address of the server-side device by exchanging data with the server-side device. In another aspect, the load balancer sends the determined server-side device to the client-side device, so as to quickly establish a data transmission channel between the first device (which can be referred to as the client-side device) and the second device (which can be referred to as the server-side device). Because data processing by the load balancer does not depend on context information, and no connection error will occur due to exceptions such as restarting and scaling in/out, data processing efficiency is effectively improved.

Figure 6:
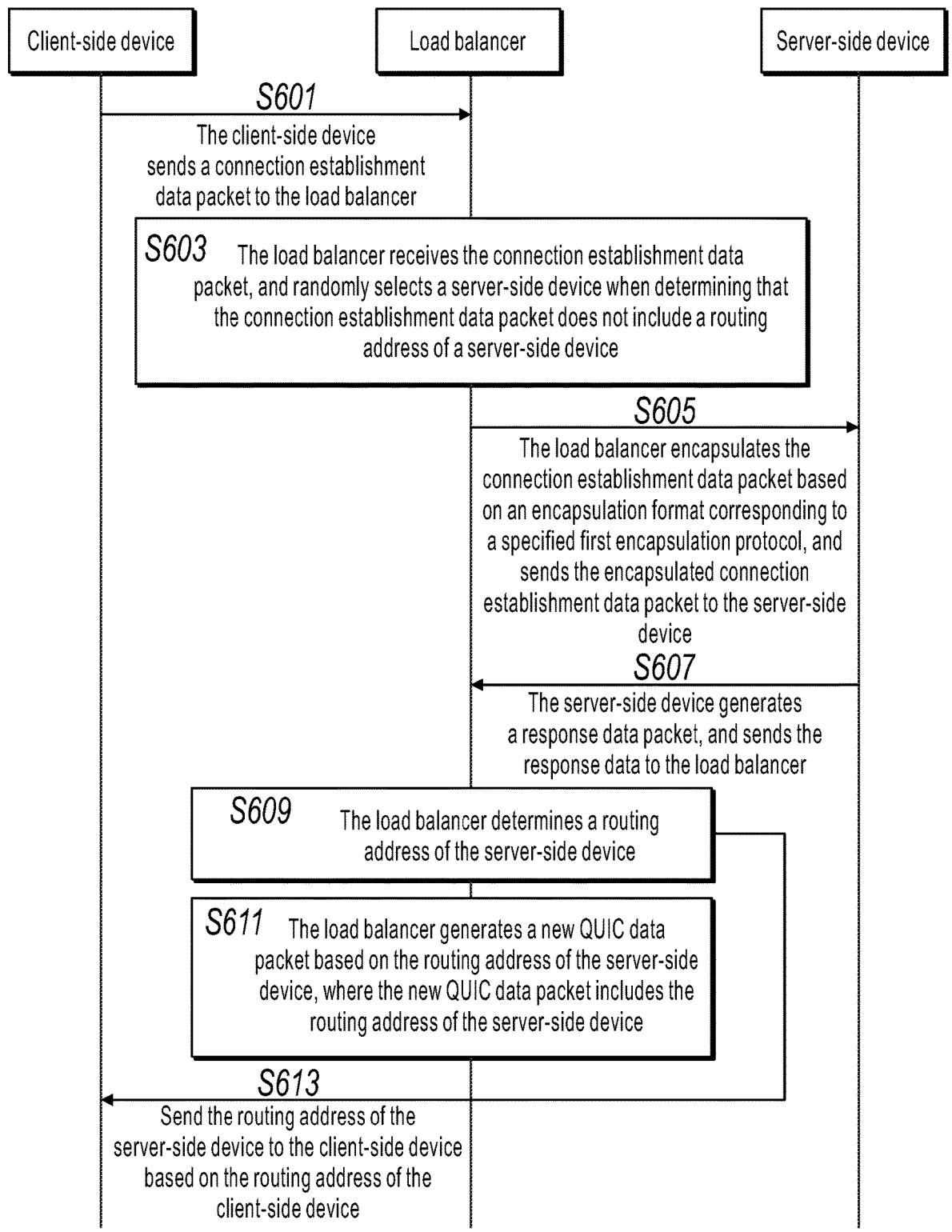
FIG. 6 is a schematic flowchart illustrating a data processing method, according to some implementations of the present specification.

Based on the same inventive concept, FIG. 6 is a schematic flowchart illustrating a data processing method, according to some implementations of the present specification. The method can be described as follows.

Step 601: A client-side device sends a connection establishment data packet to a load balancer.

The connection establishment data packet does not include a routing address of a server-side device.

In some implementations of the present specification, the client-side device sends a QUIC handshake packet to the load balancer. A purpose of the QUIC handshake packet here is to establish a data transmission channel with the server-side device, which can also be referred to as a connection establishment data packet.

The QUIC handshake packet can use a long header, and header information in the long header is relatively complete.

It is worthwhile to note that the load balancer described here can be randomly selected from multiple load balancers by the client device in a random selection way, so as to ensure load balancing of the load balancer.

Step 603: The load balancer receives the connection establishment data packet, and randomly selects a server-side device when determining that the connection establishment data packet does not include a routing address of a server-side device.

Step 605: The load balancer encapsulates the connection establishment data packet based on an encapsulation format corresponding to a specified first encapsulation protocol, and sends the encapsulated connection establishment data packet to the server-side device.

The encapsulated connection establishment data packet includes a routing address of the client-side device.

Step 607: The server-side device generates a response data packet, and sends the response data to the load balancer.

The response data includes the routing address of the client-side device.

It is worthwhile to note that the load balancer described in step 607 and the load balancer described in step 601 may be the same device, or may be different devices. The server-side device can also select one of multiple load balancers in a random selection way, so as to ensure load balancing of the load balancer.

Step 609: The load balancer determines a routing address of the server-side device.

In this implementation of the present specification, when receiving the response data packet sent by the server-side device, the load balancer determines whether the response data packet includes the routing address of the server-side device. If the response data packet does not include the routing address of the server-side device, the load balancer determines an address used by the second device to send the response data packet as the routing address of the server-side device, and performs step 611. If the response data packet includes the routing address of the server-side device, the load balancer performs step 613.

Step 611: The load balancer generates a new QUIC data packet based on the routing address of the server-side device, where the new QUIC data packet includes the routing address of the server-side device.

In this implementation of the present specification, the new QUIC data packet is encapsulated and generated based on the routing address of the server-side device and an encapsulation format corresponding to a specified second encapsulation protocol.

Step 613: Send the routing address of the server-side device to the client-side device based on the routing address of the client-side device.

In some implementations of the present specification, if it is determined in step 609 that the response data packet includes the routing address of the server-side device, the response data packet is sent to the client-side device based on the routing address of the client-side device. If it is determined in step 609 that the response data packet does not include the routing address of the server-side device, the new QUIC data packet is sent to the client-side device based on the routing address of the client-side device.

Figure 7:
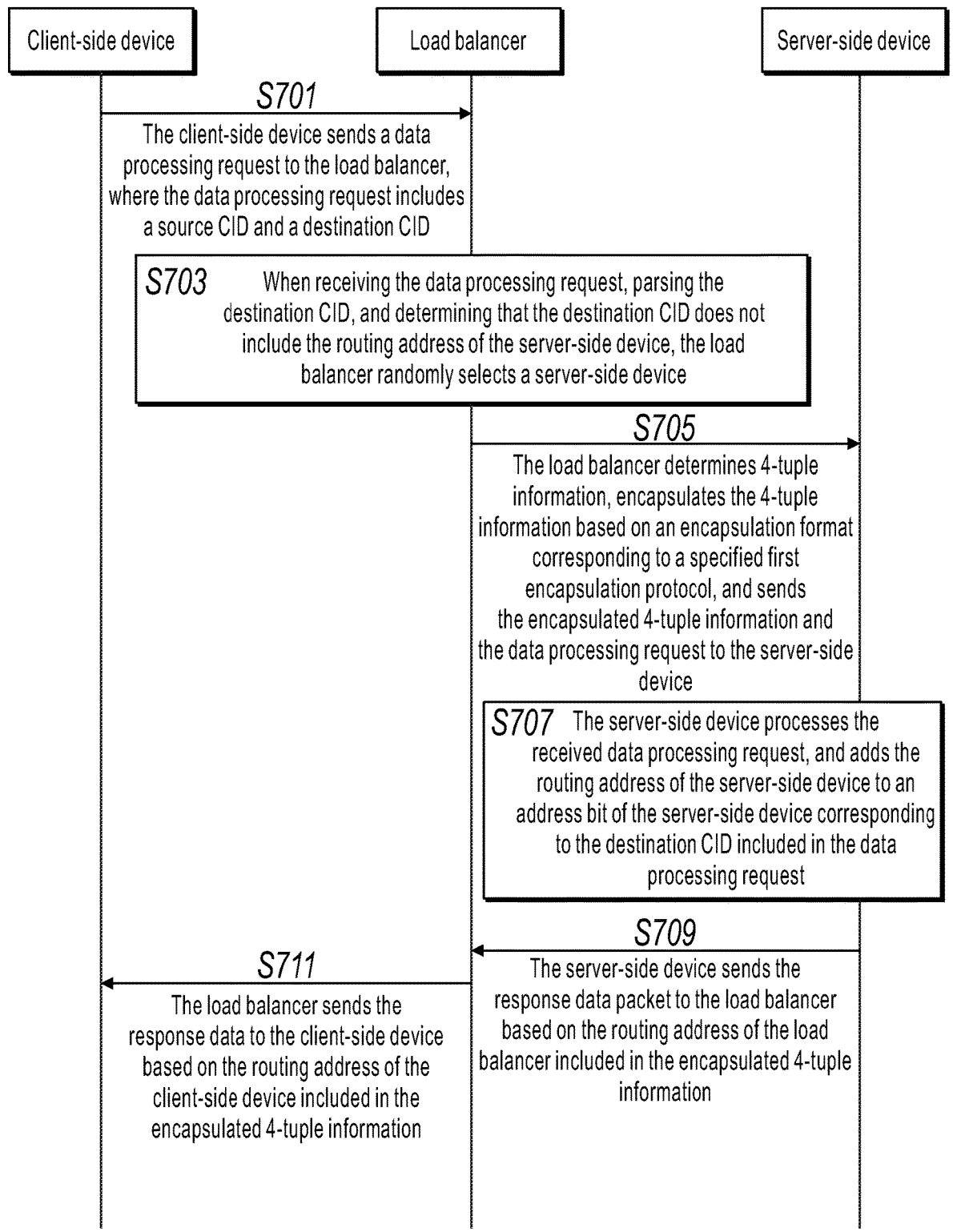
FIG. 7 is a schematic flowchart illustrating a data processing method, according to some implementations of the present specification.

Based on the same inventive concept, FIG. 7 is a schematic flowchart illustrating a data processing method, according to some implementations of the present specification. In some implementations of the present specification, the QUIC protocol is the QUIC protocol standardized by the IETF organization, and the data processing method can be as follows:

Step 701: A client-side device sends a data processing request to a load balancer, where the data processing request includes a source CID and a destination CID.

In some implementations of the present specification, the data processing request here is used to obtain a routing address of a server-side device, and the destination CID included in the data processing request is null.

Step 703: When receiving the data processing request, parsing the destination CID, and determining that the destination CID does not include the routing address of the server-side device, the load balancer randomly selects a server-side device.

Step 705: The load balancer determines 4-tuple information, encapsulates the 4-tuple information based on an encapsulation format corresponding to a specified first encapsulation protocol, and sends the encapsulated 4-tuple information and the data processing request to the server-side device.

In some implementations of the present specification, the 4-tuple information includes an IP address of the client-side device, a port of the client-side device, an IP address of the load balancer, and a port of the load balancer.

Step 707: The server-side device processes the received data processing request, and adds the routing address of the server-side device to an address bit of the server-side device corresponding to the destination CID included in the data processing request.

Specifically, the server-side device generates a response data packet based on the 4-tuple information and the modified data processing request, where the response data packet includes the routing address of the server-side device.

Step 709: The server-side device sends the response data packet to the load balancer.

Step 711: The load balancer sends the response data to the client-side device based on the routing address of the client-side device included in the encapsulated 4-tuple information.

In some implementations of the present specification, the server-side device modifies (or updates) a CID corresponding to a data transmission channel established between the server-side device and the client-side device. The client-side device does not perceive a routing address. When receiving a data request including the CID, the load balancer needs to obtain, by using a reverse parsing algorithm, the routing address of the server-side device included in the CID.

Figure 8:
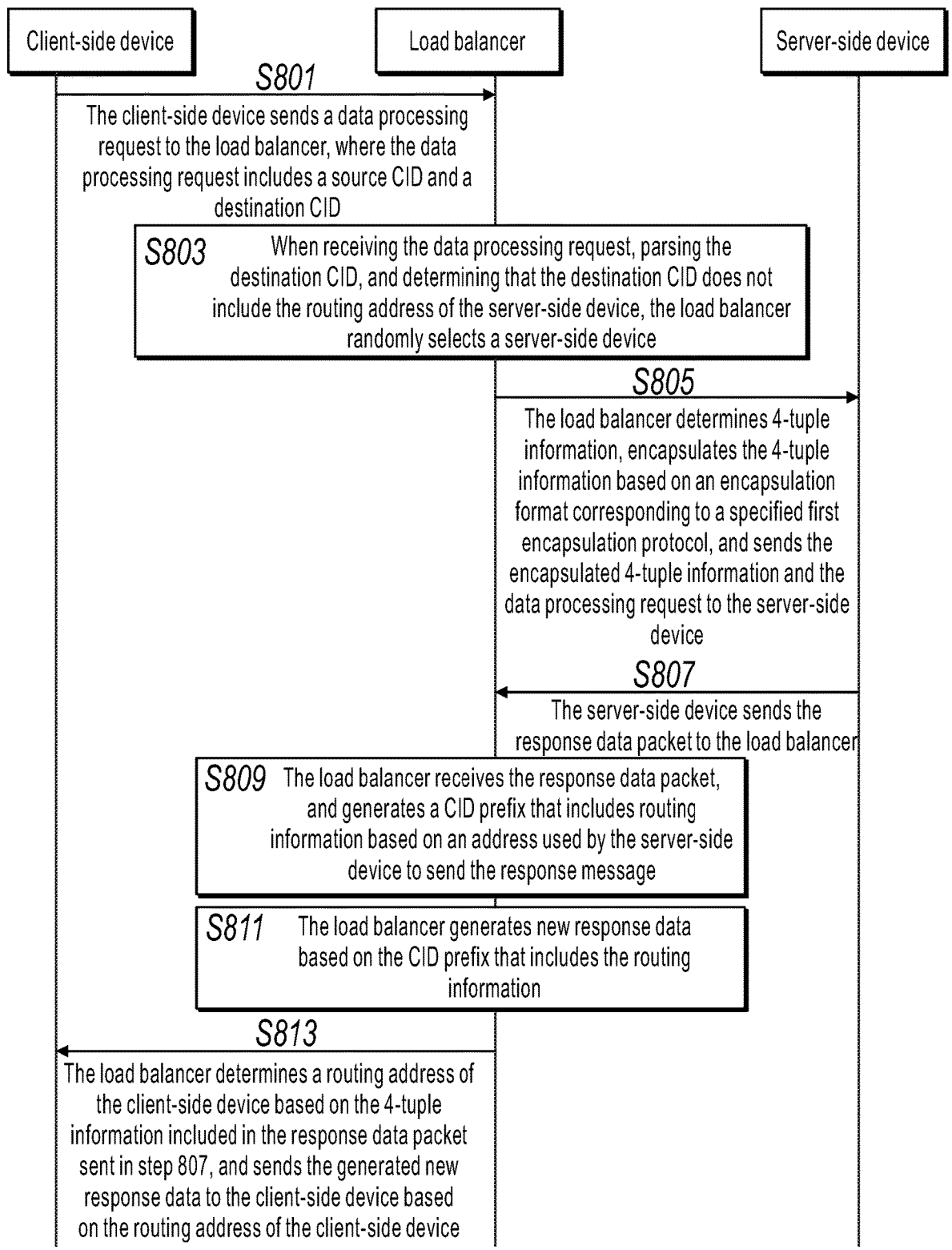
FIG. 8 is a schematic flowchart illustrating a data processing method, according to some implementations of the present specification.

Based on the same inventive concept, FIG. 8 is a schematic flowchart illustrating a data processing method, according to some implementations of the present specification. In some implementations of the present specification, that the QUIC protocol is Google QUIC is used as an example for description.

Step 801: A client-side device sends a data processing request to a load balancer, where the data processing request includes a source CID and a destination CID.

In some implementations of the present specification, the data processing request here is used to obtain a routing address of a server-side device, and the destination CID included in the data processing request is null.

Step 803: When receiving the data processing request, parsing the destination CID, and determining that the destination CID does not include the routing address of the server-side device, the load balancer randomly selects a server-side device.

Step 805: The load balancer determines 4-tuple information, encapsulates the 4-tuple information based on an encapsulation format corresponding to a specified first encapsulation protocol, and sends the encapsulated 4-tuple information and the data processing request to the server-side device.

In this implementation of the present specification, the server-side device determines, based on an encapsulation format of a specified first encapsulation protocol, 4-tuple information that includes an IP address of the first device, a port of the first device, an IP address of the load balancer, and the port of the load balancer.

Step 807: The server-side device sends the response data packet to the load balancer.

The response data packet adds the 4-tuple information compared with a normal response message, and the response data packet does not include the routing address of the second device.

Step 809: The load balancer receives the response data packet, and generates a CID prefix that includes routing information based on an address used by the server-side device to send the response message.

Step 811: The load balancer generates new response data based on the CID prefix that includes the routing information.

Step 813: The load balancer determines a routing address of the client-side device based on the 4-tuple information included in the response data packet sent in step 807, and sends the generated new response data to the client-side device based on the routing address of the client-side device.

The new response data includes the CID prefix that includes the routing information.

In some implementations of the present specification, the server-side device does not perceive a routing address, and the load balancer generates the CID prefix that includes the routing information. As such, the load balancer sends the CID prefix to the client-side device, and the client-side device caches the CID prefix. When initiating a next request, the client-side device can include the CID prefix in a data packet. When receiving the CID prefix, the load balancer can reversely parse out the routing address of the server-side device, and then route the data packet to the server-side device for processing.

Figure 9:
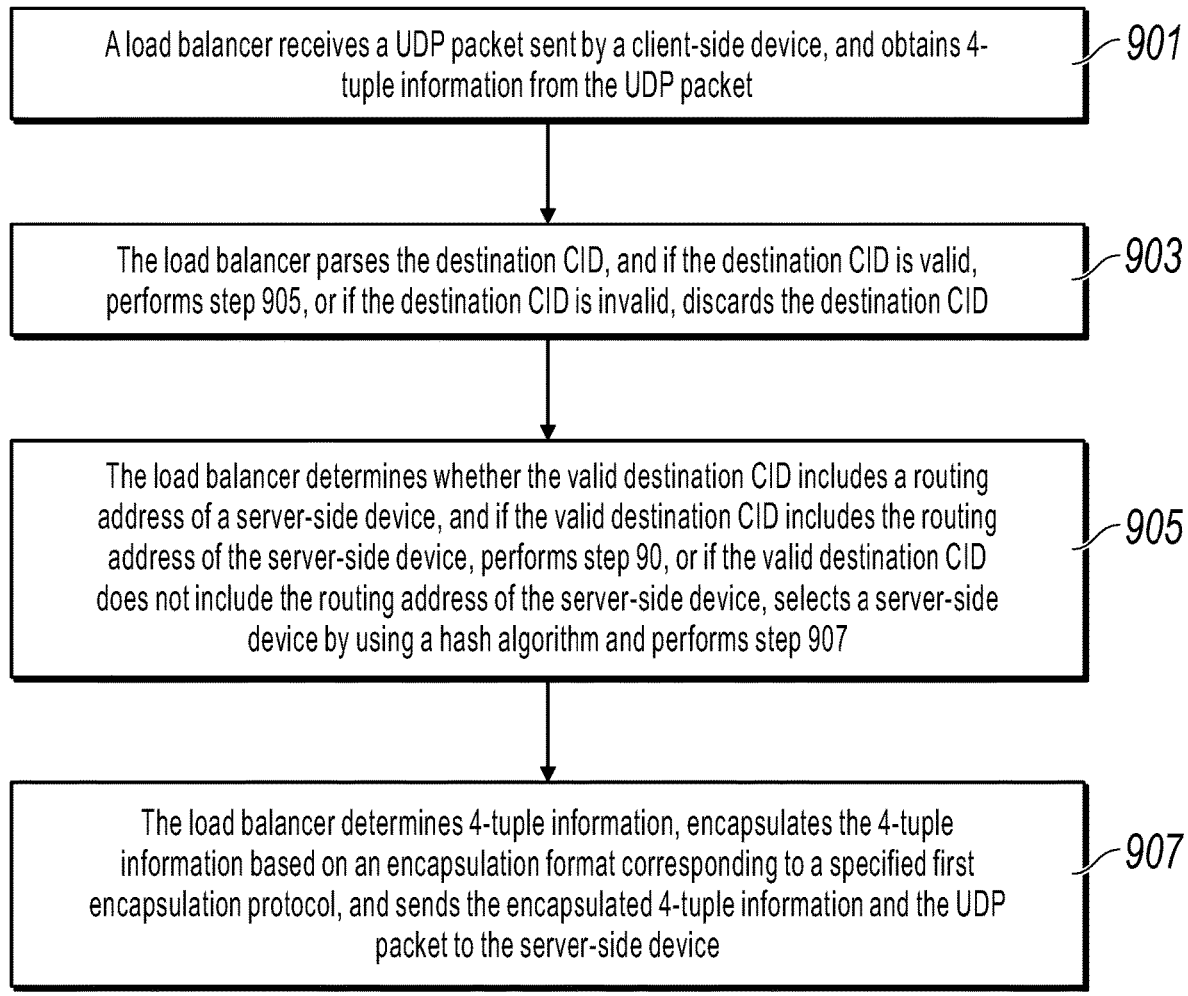
FIG. 9 is a schematic flowchart illustrating a data processing method, according to some implementations of the present specification.

Based on the same inventive concept, FIG. 9 is a schematic flowchart illustrating a data processing method, according to some implementations of the present specification. In some implementations of the present specification, how a load balancer processes G-QUIC upstream data is specifically described.

Step 901: The load balancer receives a UDP packet sent by a client-side device, and obtains 4-tuple information from the UDP packet.

In some implementations of the present specification, the 4-tuple information includes an IP address and a port of the client-side device, and an IP address and a port of the load balancer. The UDP packet further includes a source CID and a destination CID.

Step 903: The load balancer parses the destination CID, and if the destination CID is valid, performs step 905, or if the destination CID is invalid, discards the destination CID.

Step 905: The load balancer determines whether the valid destination CID includes a routing address of a server-side device, and if the valid destination CID includes the routing address of the server-side device, performs step 907, or if the valid destination CID does not include the routing address of the server-side device, selects a server-side device by using a hash algorithm and performs step 907.

In some implementations of the present specification, selecting a server-side device by using a hash algorithm specifically includes: obtaining an IP address based on a hash operation, so as to further determine whether a port number corresponding to the IP address is idle; if not, selecting an idle port and selecting a server-side device that satisfies the IP address and the port.

Step 907: The load balancer determines 4-tuple information, encapsulates the 4-tuple information based on an encapsulation format corresponding to a specified first encapsulation protocol, and sends the encapsulated 4-tuple information and the UDP packet to the server-side device.

In some implementations of the present specification, the server-side device here can be determined based on a routing address, or can be a selected server-side device.

Figure 10:
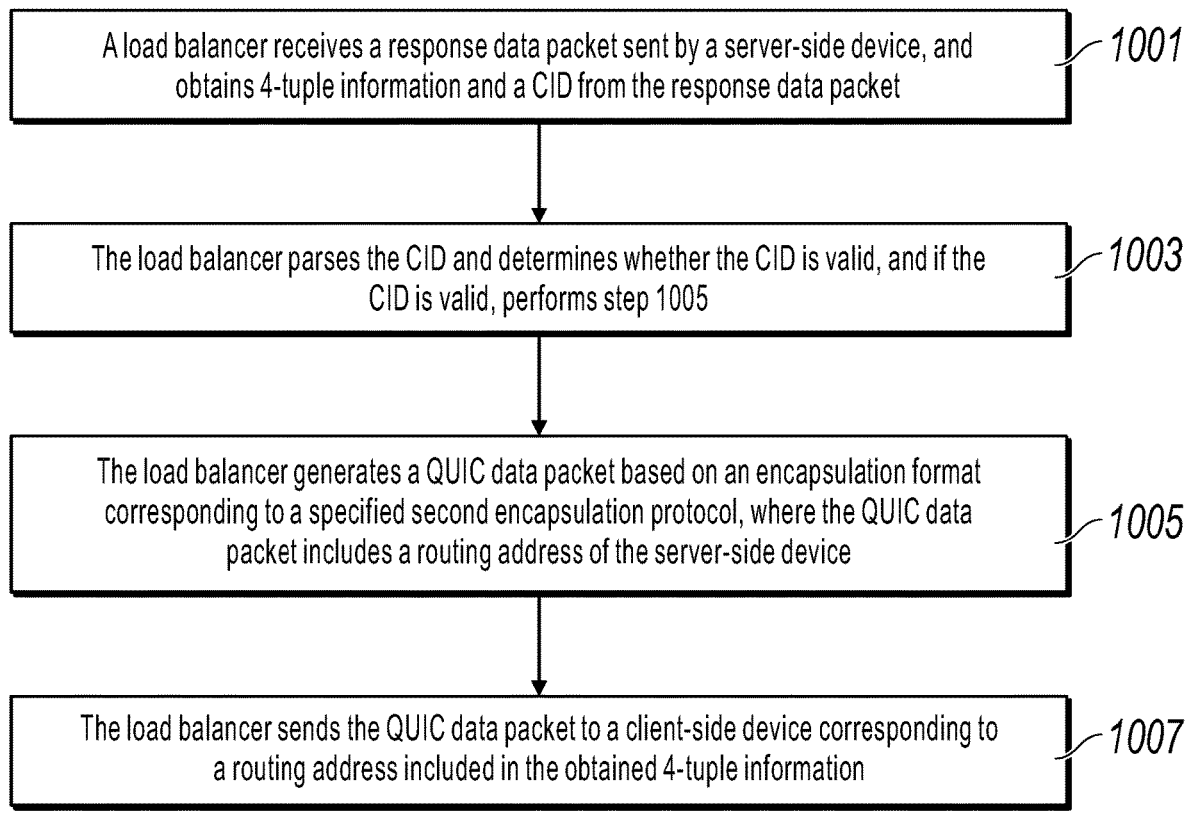
FIG. 10 is a schematic flowchart illustrating a data processing method, according to some implementations of the present specification.

Based on the same inventive concept, FIG. 10 is a schematic flowchart illustrating a data processing method, according to some implementations of the present specification. In some implementations of the present specification, how a load balancer processes G-QUIC downstream data is specifically described.

Step 1001: The load balancer receives a response data packet sent by a server-side device, and obtains 4-tuple information and a CID from the response data packet.

Step 1003: The load balancer parses the CID and determines whether the CID is valid, and if the CID is valid, performs step 1005.

Step 1005: The load balancer generates a QUIC data packet based on an encapsulation format corresponding to a specified second encapsulation protocol, where the QUIC data packet includes a routing address of the server-side device.

Step 1007: The load balancer sends the QUIC data packet to a client-side device corresponding to a routing address included in the obtained 4-tuple information.

Figure 11:
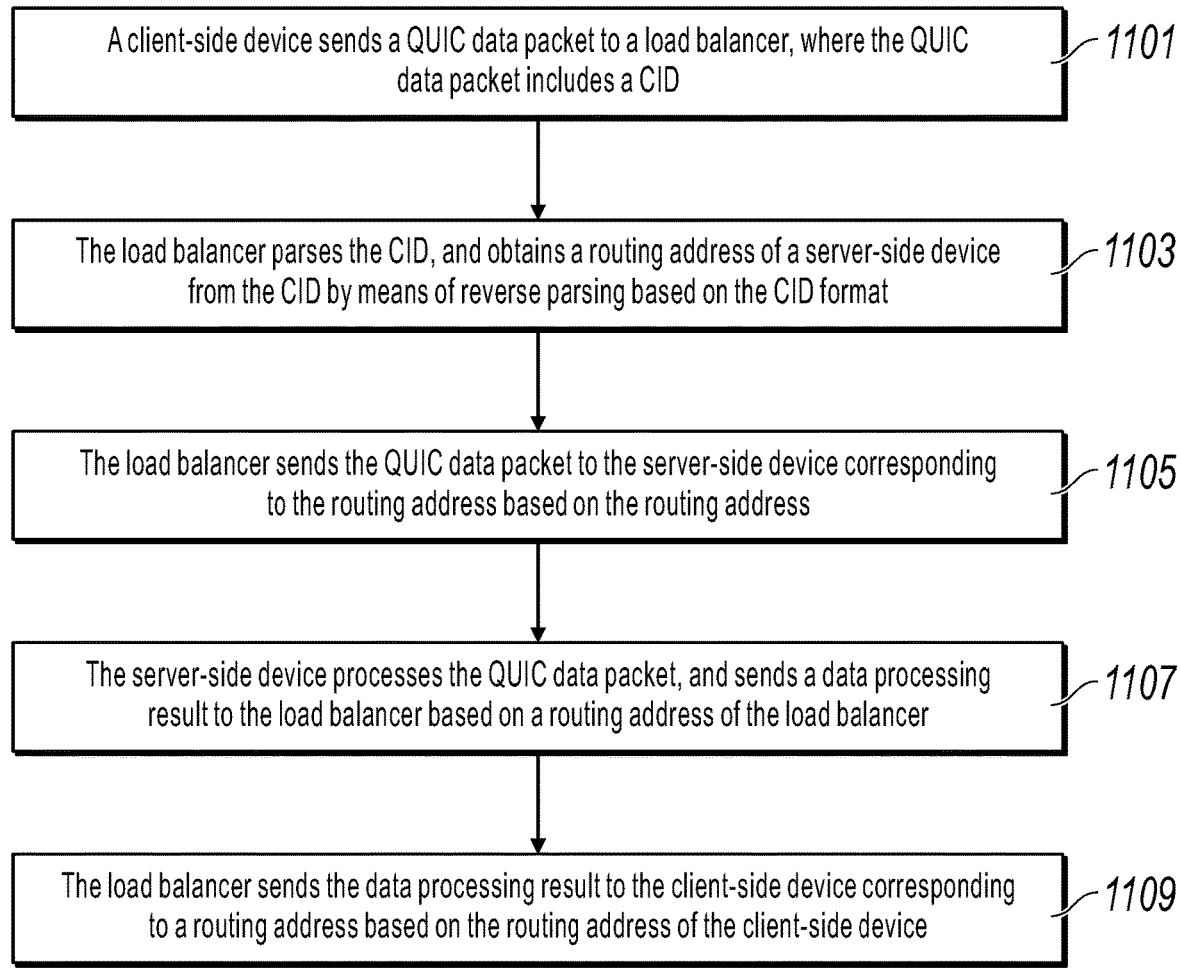
FIG. 11 is a schematic flowchart illustrating a data processing method, according to some implementations of the present specification.

Based on the same inventive concept, FIG. 11 is a schematic flowchart illustrating a data processing method, according to some implementations of the present specification.

Step 1101: A client-side device sends a QUIC data packet to a load balancer, where the QUIC data packet includes a CID.

Step 1103: The load balancer parses the CID, and obtains a routing address of a server-side device from the CID by means of reverse parsing based on the CID format.

Step 1105: The load balancer sends the QUIC data packet to the server-side device corresponding to the routing address based on the routing address.

Step 1107: The server-side device processes the QUIC data packet, and sends a data processing result to the load balancer.

Step 1109: The load balancer sends the data processing result to the client-side device corresponding to a routing address based on the routing address of the client-side device.

Figure 12:
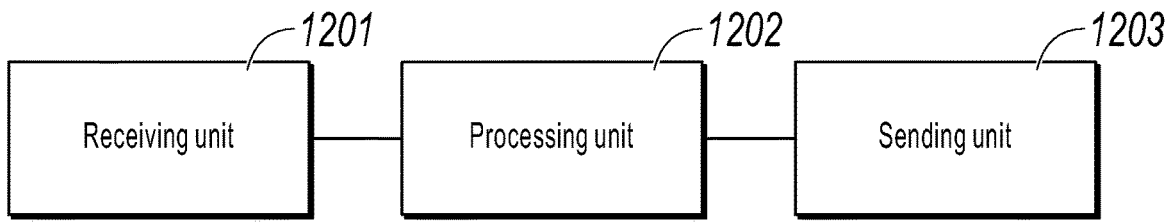
FIG. 12 is a schematic structural diagram illustrating a data processing apparatus, according to some implementations of the present specification.

Based on the same inventive concept, FIG. 12 is a schematic structural diagram illustrating a data processing apparatus, according to some implementations of the present specification. The data processing apparatus includes a receiving unit 1201, a processing unit 1202, and a sending unit 1203.

The receiving unit 1201 is configured to receive a QUIC data packet sent by a first device, where the QUIC data packet includes a connection identifier CID; the processing unit 1202 is configured to parse the CID and determine a routing address based on a parsing result; and the sending unit 1203 is configured to send the QUIC data packet to a second device based on the determined routing address, so the second device processes the QUIC data packet.

In some other implementations provided in the present specification, that the sending unit 1203 sends the QUIC data packet to a second device based on the determined routing address includes: encapsulating the QUIC data packet based on an encapsulation format corresponding to a specified first encapsulation protocol, where the encapsulated QUIC data packet includes a routing address of the first device; and sending the encapsulated QUIC data packet to the second device based on the determined routing address.

In some other implementations provided in the present specification, the receiving unit 1201 receives response data sent by the second device, where the response data includes a routing address of the first device and a processing result of the QUIC data packet; and the sending unit 1203 sends the processing result of the QUIC data packet that is included in the response data packet to the first device based on the routing address of the first device.

In some other implementations provided in the present specification, the processing unit 1202 randomly selects a second device if the parsing result does not include a routing address of the second device; encapsulates the QUIC data packet based on an encapsulation format corresponding to a specified first encapsulation protocol, where the encapsulated QUIC data packet includes a routing address of the first device; and sends the encapsulated QUIC data packet to the selected second device.

In some other implementations provided in the present specification, the receiving unit 1201 receiving a response data packet sent by the second device, where the response data includes the routing address of the first device; the processing unit 1202 determines a routing address of the second device based on the response data packet; and the sending unit 1203 sends the routing address of the second device to the first device based on the routing address of the first device.

In some other implementations provided in the present specification, that the processing unit 1202 determines the routing address of the second device based on the response data packet includes: determining that the response data packet includes the routing address of the second device, where the routing address of the second device is obtained by the second device by encapsulating the response data packet based on an encapsulation format corresponding to a specified second encapsulation protocol.

In some other implementations provided in the present specification, that the sending unit 1203 sends the routing address of the second device to the first device based on the routing address of the first device includes: sending the response data packet to the first device based on the routing address of the first device.

In some other implementations provided in the present specification, that the processing unit 1202 determines the routing address of the second device based on the response data packet includes: if the response data packet does not include the routing address of the second device, determining an address used by the second device to send the response data packet as the routing address of the second device; and generating a new QUIC data packet based on the routing address of the second device, where the new QUIC data packet includes the routing address of the second device; and that the sending unit 1203 sends the routing address of the second device to the first device based on the routing address of the first device includes: sending the new QUIC data packet to the first device based on the routing address of the first device.

In some other implementations provided in the present specification, that the processing unit 1202 generates the new QUIC data packet based on the routing address of the second device includes: encapsulating and generating the new QUIC data packet based on the routing address of the second device and an encapsulation format corresponding to a specified second encapsulation protocol.

In some other implementations provided in the present specification, the encapsulation format supported by the first encapsulation protocol includes an address bit of the load balancer and an address bit of a client-side device.

In some other implementations provided in the present specification, the encapsulation format supported by the second encapsulation protocol includes a CID identifier bit and an address bit of a server-side device.

It is worthwhile to note that the data processing apparatus provided in this implementation of the present specification can be implemented by using software or hardware, which is not specifically limited here. The data processing apparatus receives the QUIC data packet that is sent by the first device and that includes the CID, parses the CID, determines the routing address based on the parsing result, and routes the received QUIC data packet to the second device based on the routing address, so the second device processes the QUIC data packet. When receiving a data packet sent by a transmitting end device, a load balancer determines a routing address of data transmission by processing the received data packet, and quickly establishes a data transmission channel between the transmitting end device and a receiving end device. As such, stored context information is not required, and connection errors caused by exceptions such as restarting and scaling in/out on the load balancer will not occur, thereby effectively improving processing efficiency of data transmission by using the QUIC protocol.

Figure 13:
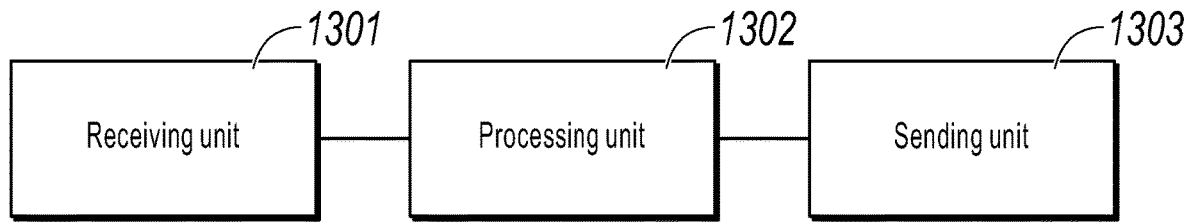
FIG. 13 is a schematic structural diagram illustrating a data processing apparatus, according to some implementations of the present specification.

Based on the same inventive concept, FIG. 13 is a schematic structural diagram illustrating a data processing apparatus, according to some implementations of the present specification. The data processing apparatus includes: a receiving unit 1301, configured to receive a connection establishment data packet sent by a client-side device, where the connection establishment data packet does not include a routing address of a server-side device; a processing unit 1302, configured to randomly select a server-side device, encapsulate the connection establishment data packet based on an encapsulation format corresponding to a specified first encapsulation protocol, and send the encapsulated connection establishment data packet to the server-side device, where the encapsulated connection establishment data packet includes a routing address of the client-side device; where the receiving unit 1301 is configured to receive response data sent by the server-side device; and the processing unit 1302 is configured to determine a routing address of the server-side device, where the response data includes the routing address of the client-side device; and a sending unit 1303, configured to send the determined routing address of the server-side device to the client-side device based on the routing address of the client-side device.

Figure 14:
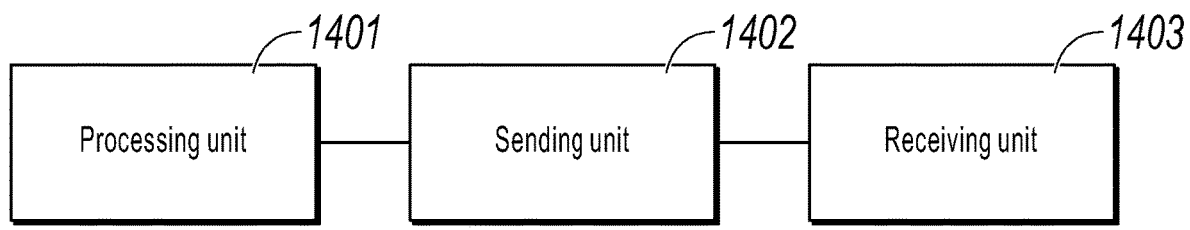
FIG. 14 is a schematic structural diagram illustrating a data processing apparatus, according to some implementations of the present specification.

Based on the same inventive concept, FIG. 14 is a schematic structural diagram illustrating a data processing apparatus, according to some implementations of the present specification. The data processing apparatus includes: a processing unit 1401, configured to generate a QUIC data packet based on an encapsulation format corresponding to a specified second encapsulation protocol, where the QUIC data packet includes a connection identifier CID; a sending unit 1402, configured to send the QUIC data to a load balancer; and a receiving unit 1403, configured to receive a data processing result sent by the load balancer, where the data processing result is obtained after the load balancer parses the CID to obtain a routing address and sends the QUIC data packet to a server-side device corresponding to the routing address, and the server-side device processes the QUIC data packet.

Figure 15:
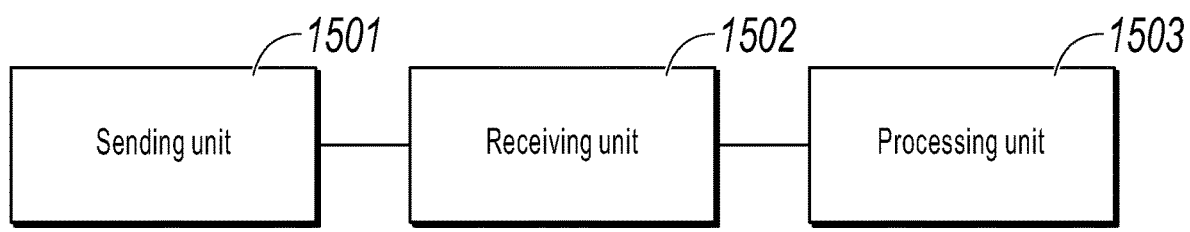
FIG. 15 is a schematic structural diagram illustrating a data processing apparatus, according to some implementations of the present specification.

Based on the same inventive concept, FIG. 15 is a schematic structural diagram illustrating a data processing apparatus, according to some implementations of the present specification. The data processing apparatus includes: a sending unit 1501, configured to send a connection establishment data packet to a load balancer, where the connection establishment data packet does not include a routing address of a server-side device; a receiving unit 1502, configured to receive a connection establishment response data packet sent by the load balancer, where the connection establishment response data packet includes a routing address of a server-side device that establishes a data transmission channel with the client-side device, the routing address of the server-side device is determined by the load balancer based on response data sent by the server-side device, and the response data is obtained by the server-side device by processing the received connection establishment data packet sent by the load balancer; and a processing unit 1503, configured to generate a QUIC data packet based on the routing address of the server-side device and an encapsulation format corresponding to a specified second encapsulation protocol.

Figure 16:
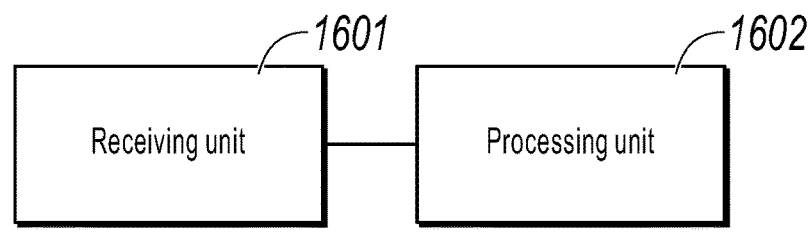
FIG. 16 is a schematic structural diagram illustrating a data processing apparatus, according to some implementations of the present specification.

Based on the same inventive concept, FIG. 16 is a schematic structural diagram illustrating a data processing apparatus, according to some implementations of the present specification. The data processing apparatus includes: a receiving unit 1601, configured to receive a connection establishment data packet sent by a load balancer, where the connection establishment data packet is obtained by the load balancer by encapsulating, based on an encapsulation format corresponding to a specified first encapsulation protocol, a received data packet sent by a client-side device, and the connection establishment data packet includes a routing address of the client-side device; and a processing unit 1602, configured to send a response data packet to the load balancer based on a routing address of the load balancer, so the load balancer determines a routing address of the server-side device based on the response data packet.

In addition, with reference to the data processing method in the previous implementation, some implementations of the present specification can provide a computer readable storage medium for implementation. The computer readable storage medium stores computer program instructions. When the computer program instructions are executed by a processor, any data processing method in the previous implementation is implemented.

Figure 17:
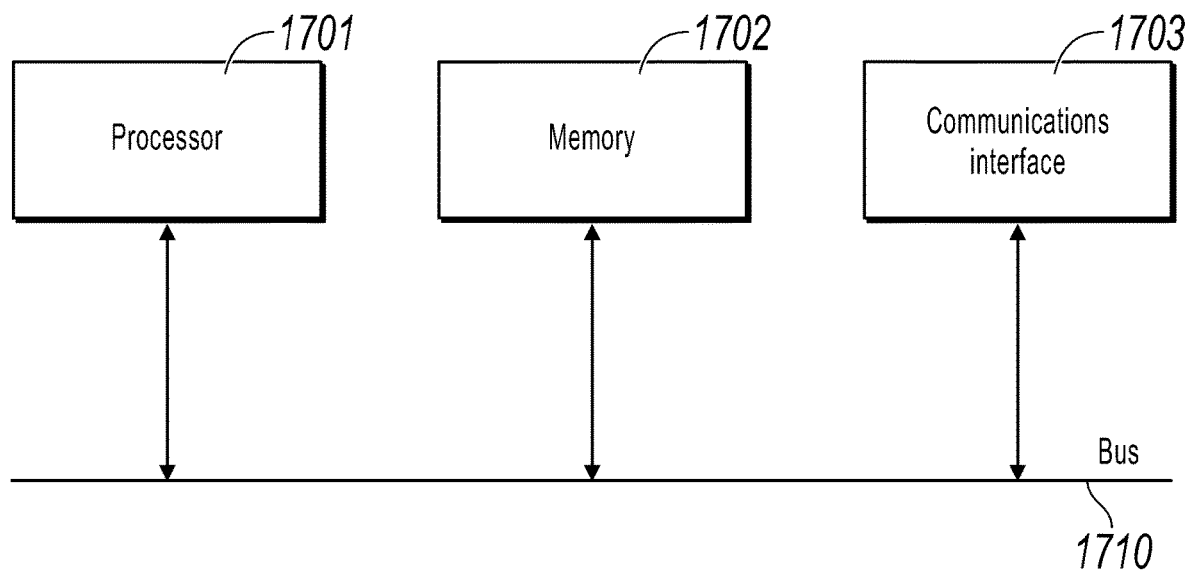
FIG. 17 is a schematic structural diagram illustrating a data processing apparatus, according to some implementations of the present specification.

FIG. 17 is a schematic structural diagram illustrating hardware of a data processing apparatus, according to some implementations of the present specification.

The data processing apparatus can include a processor 1701 and a memory 1702 that stores computer program instructions.

Specifically, the processor 1701 can include a central processing unit (CPU), an application-specific integrated circuit (ASIC), or can be configured as one or more integrated circuits for implementing this implementation of the present specification.

The memory 1702 can include a large-capacity memory used for data or instructions. By way of example instead of limitation, the memory 1702 can include a hard disk drive (HDD), a floppy drive, a flash memory, an optical disc, a magnetic disc, a magnetic tape, a universal serial bus (USB) drive, or a combination thereof. In appropriate cases, the memory 1702 can include a removable or non-removable (or fixed) medium. In appropriate cases, the memory 1702 can be inside or outside a data processing device. In a particular implementation, the memory 1702 is a non-volatile solid-state memory. In a particular implementation, the memory 1702 includes a read-only memory (ROM). In appropriate cases, the ROM can be a mask programmed ROM, a programmable ROM (PROM), an erasable PROM (EPROM), an electrically erasable PROM (EEPROM), an electrically alterable ROM (EAROM), a flash memory, or a combination thereof.

The processor 1701 reads and executes the computer program instructions stored in the memory 1702, so as to implement any data processing method in the previous implementation.

In an example, the data processing apparatus can further include a communications interface 1703 and a bus 1710. As shown in FIG. 17, the processor 1701, the memory 1702, and the communications interface 1703 are connected and complete mutual communication by using the bus 1710.

The communications interface 1703 is mainly configured to implement communication between modules, devices, units, and/or apparatuses in some implementations of the present specification.

The bus 1710 includes hardware, software, or both, and couples components of a signaling data processing apparatus together. By way of example instead of limitation, the bus can include an accelerated graphics port (AGP) or another graphics bus, an enhanced industrial standard architecture (EISA) bus, a front side bus (FSB), a hyper transport (HT) interconnection, an industrial standard architecture (ISA) bus, an infinite bandwidth interconnection, a low pin count (LPC) bus, a memory bus, a micro channel architecture (MCA) bus, a peripheral component interconnection (PCI) bus, a PCI-Express (PCI-X) bus, a serial advanced technology attachment (SATA) bus, a VESA local bus (VLB), another suitable bus, or a combination thereof. In appropriate cases, the bus 410 can include one or more buses. Although implementations of the present specification describe and illustrate specific buses, the present disclosure considers any suitable bus or interconnection.

According to the data processing method and device provided in the implementations of the present specification, the QUIC data packet that is sent by the first device and that includes the CID is received, the CID is parsed, the routing address is determined based on the parsing result, and the received QUIC data packet is routed to the second device based on the routing address, so the second device processes the QUIC data packet. When receiving a data packet sent by a transmitting end device, a load balancer determines a routing address of data transmission by processing the received data packet, and quickly establishes a data transmission channel between the transmitting end device and a receiving end device. As such, stored context information is not required, and connection errors caused by exceptions such as restarting and scaling in/out on the load balancer will not occur, thereby effectively improving processing efficiency of data transmission by using the QUIC protocol.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, such programming is mostly implemented by using "logic compiler" software. The logic compiler software is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microcontroller. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the apparatus above is described by dividing functions into various units. Certainly, when the present specification is implemented, a function of each unit can be implemented in one or more pieces of software and/or hardware.

A person skilled in the art should understand that some implementations of the present disclosure can be provided as a method, a system, or a computer program product. Therefore, the present disclosure can use a form of hardware only implementations, software only implementations, or implementations with a combination of software and hardware. Moreover, the present disclosure can use a form of a computer program product that is implemented on one or more computer-usable storage media (including but not limited to a disk memory, a CD-ROM, an optical memory, etc.) that include computer-usable program code.

The present disclosure is described with reference to the flowcharts and/or block diagrams of the method, the device (system), and the computer program product based on the implementations of the present disclosure. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing apparatus to generate a machine, so the instructions executed by the computer or the processor of the another programmable data processing apparatus generate a device for implementing a specific function in one or more processes in the flowcharts and/or in one or more blocks in the block diagrams.

These computer program instructions can be stored in a computer readable memory that can instruct the computer or the another programmable data processing apparatus to work in a specific way, so the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing apparatus, so a series of operations and operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more central processing units (CPUs), an input/output interface, a network interface, and a memory.

The memory can include a non-persistent memory, a random access memory (RAM), and/or a non-volatile memory in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. As described in the present application, the computer readable medium does not include computer readable transitory media such as a modulated data signal and a carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

The present specification can be described in the general context of computer-executable instructions, for example, a program module. Generally, the program module includes a routine, a program, an object, a component, a data structure, etc. executing a specific task or implementing a specific abstract data type. The present specification can alternatively be practiced in distributed computing environments in which tasks are performed by remote processing devices that are connected through a communications network. In a distributed computing environment, the program module can be located in both local and remote computer storage media including storage devices.

The implementations in the present specification are described in a progressive way. For same or similar parts of the implementations, references can be made to the implementations mutually. Each implementation focuses on a difference from other implementations. Particularly, a system implementation is similar to a method implementation, and therefore is described briefly. For related parts, references can be made to related descriptions in the method implementation.

The previous implementations are implementations of the present specification, and are not intended to limit the present specification. A person skilled in the art can make various modifications and changes to the present specification. Any modification, equivalent replacement, or improvement made without departing from the spirit and principle of the present specification shall fall within the scope of the claims in the present specification.

What is claimed is:

1. A computer-implemented method comprising:
   receiving, by a load balancer, a quick user datagram protocol internet connection (QUIC) data packet sent by a first device, wherein the load balancer supports QUIC protocol, and wherein the QUIC data packet comprises a connection identifier (CID), wherein the CID comprises a first bit and a routing address of the first device, wherein the first bit precedes the routing address of the first device;
   parsing, by the load balancer, the CID to generate a parsing result;
   determining, by the load balancer, a routing address of a second device based on the parsing result;
   encapsulating, by the load balancer, the QUIC data packet by writing content of one or more components of the parsing result into one or more corresponding fields of the QUIC data packet based on a first encapsulation protocol; and
   sending the encapsulated QUIC data packet to the second device based on the determined routing address of the second device, wherein the second device processes the encapsulated QUIC data packet.

2. The computer-implemented method of claim 1, wherein
   the encapsulated QUIC data packet comprises the routing address of the first device.

3. The computer-implemented method of claim 2, wherein the method further comprises:
   receiving response data sent by the second device, wherein the response data comprises the routing address of the first device and a processing result of the encapsulated QUIC data packet; and
   sending the processing result of the encapsulated QUIC data packet to the first device based on the routing address of the first device.

4. The computer-implemented method of claim 2, wherein the method further comprises:
   receiving a response data packet sent by the second device, wherein the response data packet comprises the routing address of the first device;
   determining the routing address of the second device based on the response data packet; and
   sending the routing address of the second device to the first device based on the routing address of the first device.

5. The computer-implemented method of claim 4, wherein determining the routing address of the second device based on the response data packet comprises determining that the response data packet comprises the routing address of the second device, wherein the routing address of the second device is obtained by the second device by encapsulating the response data packet based on a specified second encapsulation protocol, and wherein sending the routing address of the second device to the first device based on the routing address of the first device comprises sending the response data packet to the first device based on the routing address of the first device.

6. The computer-implemented method of claim 4, wherein determining the routing address of the second device based on the response data packet comprises determining the response data packet does not comprise the routing address of the second device, determining an address used by the second device to send the response data packet as the routing address of the second device, and generating a new QUIC data packet based on the routing address of the second device, wherein the new QUIC data packet comprises the routing address of the second device, and wherein sending the routing address of the second device to the first device based on the routing address of the first device comprises sending the new QUIC data packet to the first device based on the routing address of the first device.

7. The computer-implemented method of claim 6, wherein generating the new QUIC data packet is also based on a specified second encapsulation protocol.

8. The computer-implemented method of claim 7, wherein an encapsulation format supported by the second encapsulation protocol comprises a CID identifier bit and an address bit of a server-side device.

9. The computer-implemented method of claim 2, wherein an encapsulation format supported by the first encapsulation protocol comprises an address bit of the load balancer and an address bit of a client-side device.

10. The computer-implemented method of claim 1, wherein determining the routing address of the second device comprises:
   determining the parsing result does not comprise the routing address of the second device;
   selecting the second device based on a predetermined algorithm; and
   determining the routing address of the second device based on the selected second device.

11. The computer-implemented method of claim 1, wherein parsing the CID to generate the parsing result comprises parsing the first bit of the CID, and wherein determining the routing address of the second device based on the parsing result comprises:
   comparing the first bit of the CID to a target value; and
   determining the routing address of the second device based on the first bit of the CID matching the target value.

12. A non-transitory, computer-readable medium storing one or more instructions executable by a computer system to perform operations comprising:
   receiving, by a load balancer, a quick user datagram protocol internet connection (QUIC) data packet sent by a first device, wherein the load balancer supports QUIC protocol, and wherein the QUIC data packet comprises a connection identifier (CID), wherein the CID comprises a first bit and a routing address of the first device, wherein the first bit precedes the routing address of the first device;
   parsing, by the load balancer, the CID to generate a parsing result;
   determining, by the load balancer, a routing address of a second device based on the parsing result;
   encapsulating, by the load balancer, the QUIC data packet by writing content of one or more components of the parsing result into one or more corresponding fields of the QUIC data packet based on a first encapsulation protocol; and
   sending the encapsulated QUIC data packet to the second device based on the determined routing address of the second device, wherein the second device processes the encapsulated QUIC data packet.

13. The non-transitory, computer-readable medium of claim 12, wherein
   the encapsulated QUIC data packet comprises the routing address of the first device.

14. The non-transitory, computer-readable medium of claim 13, wherein the operations further comprise:
   receiving response data sent by the second device, wherein the response data comprises the routing address of the first device and a processing result of the encapsulated QUIC data packet; and
   sending the processing result of the encapsulated QUIC data packet to the first device based on the routing address of the first device.

15. The non-transitory, computer-readable medium of claim 13, wherein the operations further comprise:
   receiving a response data packet sent by the second device, wherein the response data packet comprises the routing address of the first device;
   determining the routing address of the second device based on the response data packet; and
   sending the routing address of the second device to the first device based on the routing address of the first device.

16. The non-transitory, computer-readable medium of claim 15, wherein determining the routing address of the second device based on the response data packet comprises determining that the response data packet comprises the routing address of the second device, wherein the routing address of the second device is obtained by the second device by encapsulating the response data packet based on a specified second encapsulation protocol, and wherein sending the routing address of the second device to the first device based on the routing address of the first device comprises sending the response data packet to the first device based on the routing address of the first device.

17. The non-transitory, computer-readable medium of claim 15, wherein determining the routing address of the second device based on the response data packet comprises determining the response data packet does not comprise the routing address of the second device, determining an address used by the second device to send the response data packet as the routing address of the second device, and generating a new QUIC data packet based on the routing address of the second device, wherein the new QUIC data packet comprises the routing address of the second device, and wherein sending the routing address of the second device to the first device based on the routing address of the first device comprises sending the new QUIC data packet to the first device based on the routing address of the first device.

18. The non-transitory, computer-readable medium of claim 17, wherein generating the new QUIC data packet is also based on a specified second encapsulation protocol.

19. The non-transitory, computer-readable medium of claim 18, wherein an encapsulation format supported by the second encapsulation protocol comprises a CID identifier bit and an address bit of a server-side device.

20. The non-transitory, computer-readable medium of claim 12, wherein an encapsulation format supported by the first encapsulation protocol comprises an address bit of the load balancer and an address bit of a client-side device.

21. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, by a load balancer, a quick user datagram protocol internet connection (QUIC) data packet sent by a first device, wherein the load balancer supports QUIC protocol, and wherein the QUIC data packet comprises a connection identifier (CID), wherein the CID comprises a first bit and a routing address of the first device, wherein the first bit precedes the routing address of the first device;
parsing, by the load balancer, the CID to generate a parsing result;
determining, by the load balancer, a routing address of a second device based on the parsing result;
encapsulating, by the load balancer, the QUIC data packet by writing content of one or more components of the parsing result into one or more corresponding fields of the QUIC data packet based on a first encapsulation protocol; and
sending the encapsulated QUIC data packet to the second device based on the determined routing address of the second device, wherein the second device processes the encapsulated QUIC data packet.

22. The computer-implemented system of claim 21, wherein the encapsulated QUIC data packet comprises the routing address of the first device.

23. The computer-implemented system of claim 22, wherein the operations further comprise:
receiving response data sent by the second device, wherein the response data comprises the routing address of the first device and a processing result of the encapsulated QUIC data packet; and
sending the processing result of the encapsulated QUIC data packet to the first device based on the routing address of the first device.

24. The computer-implemented system of claim 22, wherein the operations further comprise:
receiving a response data packet sent by the second device, wherein the response data packet comprises the routing address of the first device;
determining the routing address of the second device based on the response data packet; and
sending the routing address of the second device to the first device based on the routing address of the first device.

25. The computer-implemented system of claim 24, wherein determining the routing address of the second device based on the response data packet comprises determining that the response data packet comprises the routing address of the second device, wherein the routing address of the second device is obtained by the second device by encapsulating the response data packet based on a specified second encapsulation protocol, and
wherein sending the routing address of the second device to the first device based on the routing address of the first device comprises sending the response data packet to the first device based on the routing address of the first device.

26. The computer-implemented system of claim 24, wherein determining the routing address of the second device based on the response data packet comprises determining the response data packet does not comprise the routing address of the second device, determining an address used by the second device to send the response data packet as the routing address of the second device, and generating a new QUIC data packet based on the routing address of the second device, wherein the new QUIC data packet comprises the routing address of the second device, and
wherein sending the routing address of the second device to the first device based on the routing address of the first device comprises sending the new QUIC data packet to the first device based on the routing address of the first device.

27. The computer-implemented system of claim 26, wherein generating the new QUIC data packet is also based on a specified second encapsulation protocol.

28. The computer-implemented system of claim 27, wherein an encapsulation format supported by the second encapsulation protocol comprises a CID identifier bit and an address bit of a server-side device.

29. The computer-implemented system of claim 22, wherein an encapsulation format supported by the first encapsulation protocol comprises an address bit of the load balancer and an address bit of a client-side device.

* * * * *